3,355,503
PREPARATION OF HYDROQUINONE

Piero Pino, Pisa, Giuseppe Braca, S. Frediano a Settimo, and Glauco Sbrana, Pisa, Italy, assignors to Lonza Ltd., Gampel, Switzerland (Direction: Basel, Switzerland)
No Drawing. Filed Aug. 13, 1964, Ser. No. 389,478
Claims priority, application Switzerland,
Aug. 15, 1963, 10,091/63
5 Claims. (Cl. 260—621)

This invention relates to the catalytic preparation of hydroquinone from acetylene.

It is known to form hydroquinone from acetylene at elevated temperatures and elevated pressures according to the following reaction:

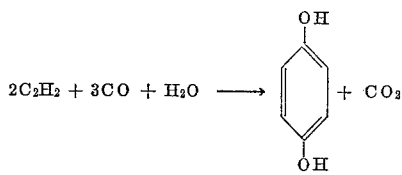

$$2C_2H_2 + 3CO + H_2O \longrightarrow \text{(hydroquinone)} + CO_2$$

Instead of water also organic solvents which contain a hydroxyl group such as alcohols can be employed. The carbon monoxide used in the reaction can be provided either entirely by iron carbonyl or cobalt carbonyl in stoichiometrical amounts or as carbon monoxide gas, whereby in the latter case such iron or cobalt compounds must be present in the reaction medium which form under reaction condition these carbonyls (German Patent 870,698).

It is also known to use instead of iron carbonyl or cobalt carbonyl a complex salt of a hydrogen compound of a metal carbonyl, e.g. $[Fe(NH_3)_6] \cdot [Co(CO)_4]_2$ (German Patent 874,910). In these cases large amounts of such carbonyl compounds are needed.

Furthermore it is known to carry out the reaction of acetylene and carbon monoxide in presence of a hydroxyl group containing component with a compound of ruthenium or rhodium, for example a halide, carbonyl or chelate as catalyst. The yields of hydroquinone calculated on acetylene are, when a catalyst on ruthenium basis is used, below 20 percent although very high pressures, e.g. 700–1500 atm. and high concentrations of catalyst are employed. If the very expensive rhodium chloride is used as catalyst, the yields can be improved, but in this case corrosion problems, common with the use of halides, occur. When the hydroxyl group containing component is replaced by a polar oxygen containing solvent such as an ether or ketone instead of hydroquinone, quinhydrone is formed.

It is also known that the reaction from acetylene and carbon monoxide and hydrogen in presence of a cobalt catalyst, e.g. dicobaltoctacarbonyl give a carbonyl compound (hydroformylation). By using hydrogen and an alcohol simultaneously an ester and an aldehyde group could be introduced into acetylene (G. Natta, P. Pino "La Chimica e l'Industria," 1952, 34, p. 449, and G. F. Crowe "Chemistry and Industry," 1960, p. 1000).

We have found that it is possible to prepare hydroquinone from acetylene, carbon monoxide, and hydrogen in the absence of water or hydroxyl containing components in the presence of trimeric ruthenium carbonyl $[Ru(CO)_4]_3$ or compounds forming said ruthenium carbonyl under the conditions of the reaction. Our novel method avoids losses of carbon monoxide which, in the presence of hydroxyl groups containing components, is converted to $CO_2$.

Further our method can be performed with small amounts of catalyst, which can be reused many times without loss of activity.

This result is surprising as the reaction with CO and $H_2$ (hydroformylation) in the presence of metals of the group VIII of the periodic system, such as cobalt, normally converts unsaturated compounds into carbonyl compounds, and a similar reaction was to be expected from acetylene. It was, therefore, unexpected that with the use of ruthenium tetracarbonyl under the conventional conditions for the hydroformylation reaction, hydroquinone could be obtained as main reaction product.

The invention comprises a process for the preparation of hydroquinone by reaction of acetylene with carbon monoxide and hydrogen at elevated temperatures and elevated pressures in the presence of an organic solvent which does not contain a mobile hydrogen atom where the reaction is carried out in the presence of trimeric ruthenium tetracarbonyl as catalyst.

Preferably, the reaction is carried out at temperatures of 100–300° C and at a total pressure in the range of 50–350 atm. The catalyst is used in amounts of 0.5 to 1 g. per liter of solution; larger amounts could, of course, be used but do not substantially increase the rate of conversion.

The trimeric ruthenium tetracarbonyl can be formed during the reaction from compounds convertible thereto under the reaction conditions. Such compounds are, for instance, ruthenium acetyl acetonate or basic ruthenium acetate.

Suitable solvents, which do not contain a mobile hydrogen atom, are hydrocarbons such as benzene, ketones such as acetone or methylethylketone, ethers like dioxane or tetrahydrofurane, and esters such as ethyl acetate. Though the amount of solvent is not critical, the mole proportion solvent: introduced acetylene should, if possible, be maintained in the range of 2 to 15.

The mole ratio $CO/H_2$ may be within wide limits but should remain in the range of 0.2 to 10, preferably between 1 and 2.

The hydroquinone is recovered from the reaction mixture by first distilling off the solvent and then subjecting the distillation residue to sublimation. It is also possible to extract the hydroquinone from the distillation residue with a suitable solvent, and then to crystallize it out of the solvent.

The reaction can be carried out continuously or as a batch process. As a reaction vessel, we prefer to use an autoclave of acid resistant material.

The following examples are submitted to illustrate and not to limit the invention.

Example 1

Into a shaking autoclave of acid resistant material having a capacity of 125 cm.³, there were charged 0.1 g. of trimeric ruthenium carbonyl $[Ru(CO)_4]_3$, and after removal of the air, 75 g. of dioxane and 3.42 N l. of acetylene.

A mixture of CO and $H_2$, in a mole ratio of 1.2:1, was then forced into the autoclave to a final pressure of 175 atm., and the autoclave was heated at 150° C. with shaking.

After 6 hours, the reactor was cooled, and the pressure was released. The escaping gases were analyzed; they contained 0.37 N l. of unreacted acetylene.

The liquid reaction products were removed from the autoclave and distilled at normal pressure. Subsequently, the distillation residue of 5.10 g. was sublimed at a temperature of 100–150° C. under a pressure of 1.5–2 mm. Hg.

2.18 g. of hydroquinone (M.P.=171–172° C.) were obtained, corresponding to a yield of 29.5 percent, calculated on reacted acetylene.

Example 2

Into a shaking autoclave, there were charged, as in Example 1, 0.1 g. of trimeric ruthenium tetracarbonyl, and after removal of the air, 59.5 g. of acetone and 4.01 N l. of acetylene.

Subsequently, a mixture of CO and $H_2$ in a mole ratio of 1:1 was pressured into the autoclave up to a pressure of 160 atm. The autoclave was then heated at 130° C. with shaking.

After 7 hours, the autoclave was cooled, and the pressure was released. 1.02 N l. of unreacted acetylene was determined in the gases.

The processing of the liquid reaction products was carried out as in Example 1. 1.3 g. of hydroquinone having a melting point of 170–172° C. were recovered, corresponding to a yield 18.1 percent, calculated on reacted acetylene.

Example 3

As in the preceding examples, 0.1 g. of trimeric ruthenium tetracarbonyl, and after removal of the air, 60 g. of methylethylketone and 3.35 N l. of acetylene were charged into a shaking autoclave. Subsequently, CO and $H_2$ in the mole ratio of 1:1 were pressured into the autoclave to a pressure of 144 atm., and the autoclave was heated at 200° C. with shaking.

After 3½ hours, the autoclave was cooled, and the pressure released. 0.213 N l. of acetylene could be determined in the escaping gases.

The reaction mixture, processed as in the preceding examples, yielded 1.63 g. of hydroquinone, melting at 170–172° C., corresponding to a yield of 21.2 percent, calculated on reacted acetylene.

Example 4

As in the preceding examples, a shaking autoclave was charged with 0.1 g. of trimeric ruthenium tetracarbonyl, 66.5 g. of tetrahydrofurane, and 3.06 N l. of acetylene. CO and $H_2$ in the mole ratio of 1:1 were forced into the autoclave to a pressure of 160 atm., and the autoclave was heated for 4½ hours at 180° C. with shaking. After cooling and pressure release, 0.184 N l. of unreacted acetylene were found in the gases.

The liquid reaction mixture was distilled at atmospheric pressure, and the distillation residue (4.2 g.) was sublimed at 100–150° C. and 1.5–2 mm. Hg. There were obtained 2.35 g. of hydroquinone, corresponding to a yield of 33.5 percent, calculated on reacted acetylene.

Example 5

Into a shaking autoclave similar to that used in the preceding examples, there were charged 0.1 g. of trimeric ruthenium tetracarbonyl and, after displacement of the air, 67.5 g. of ethyl acetate and 3.65 N l. of acetylene.

The final pressure of 170 atm. was produced by forcing CO and $H_2$ in a mole ratio of 1:1 into the autoclave, which was heated at 130° C. with shaking.

After 7 hours, the autoclave was cooled, and the gases were released. They contained 0.74 N l. of unreacted acetylene.

The liquid reaction product was distilled at normal pressure, and 1.0 g. of hydroquinone was isolated from the distillation residue (2.87 g.) by sublimation at 100–150° C. and 1.5–2 mm. Hg. The yield, calculated on reacted acetylene, was 14.4%.

Example 6

Into a shaking autoclave of a capacity of 485 cm.³, there were charged 0.1 g. of trimeric ruthenium tetracarbonyl and, after displacement of the air, 75 g. of dioxane and 6.53 N l. of acetylene.

Subsequently, CO and $H_2$ in a mole ratio of 1:1 were forced into the autoclave to an end pressure of 174 atm. The autoclave was heated at 200° C. with shaking.

After 1½ hours, the autoclave was cooled and the pressure released, 0.5 N l. of acetylene had not reacted. After processing the liquid reaction product, 4.76 g. of hydroquinone were recovered, corresponding to a yield of 32.2 percent, calculated on reacted acetylene.

Example 7

Into a shaking autoclave of the same capacity as in Example 6, there were charged 0.15 g. of trimeric ruthenium tetracarbonyl and, after removal of the air, 200 g. of dioxane and 13.45 N l. of acetylene.

Subsequently, a mixture of CO and $H_2$ in a mole ratio of 1:1 was forced into the autoclave to a pressure of 175 atm., and the autoclave was heated at 200° C.

After 3½ hours, the autoclave was cooled with release of the pressure. 0.186 N l. of acetylene were determined in the escaping gases.

The autoclave was not emptied but further 8.1 N l. acetylene were slowly introduced, the pressure was again increased to 175 atm. by means of a mixture of CO and $H_2$ in a mole ratio of 1:1, and the autoclave was again heated with shaking up to 200° C. After 3½ hours, the autoclave was again cooled, and the pressure was released. 0.13 N l. of acetylene were determined in the escaping gas.

Then, a third charge of 9.13 N l. of acetylene was introduced into the autoclave, under the same conditions as before. Finally, in a fourth charge, 12.05 N l. were reacted. The amount of unreacted acetylene in the waste gas was in the third charge 0.116 N l., and in the fourth charge 0.139 N l.

The liquid reaction product was removed from the autoclave and filtered. From the filtered solid residue, there were obtained by sublimation at 100–150° C. and a pressure of 1.5–2 mm. Hg, 9.0 g. of hydroquinone (M.P.=171–172° C.).

The liquid filtrate was distilled at normal pressure. Hydroquinone was extracted from the distillation residue (63 g.) with warm water, and recovered from the aqueous solution by extraction with ether. After evaporation of the ether and sublimation of the residue at 100–150° C. at a pressure of 1.5–2 mm. Hg, there were obtained 20.6 g. of hydroquinone melting at 171–172° C.

The yield of hydroquinone, calculated on the reacted acetylene, was 28.7 percent.

Example 8

A shaking autoclave was used as in the preceding example and charged with 0.15 g. of ruthenium acetyl acetonate, $Ru(C_5H_7O_2)_3$ and, after removal of the air, with 150 g. of dioxane and 9.75 N l. of acetylene.

Subsequently, a mixture of CO and $H_2$ in the mole ratio of 1:1 was forced into the autoclave up to a pressure of 175 atm., and the autoclave was heated at 200° C. with shaking.

After 1½ hours, the autoclave was cooled and the pressure released. 0.345 N. l. of unreacted acetylene were found in the escaping gases.

The liquid products were then removed from the autoclave and distilled. There remained 20.05 g. of a distillation residue from which hydroquinone was extracted with warm water. Said dissolved hydroquinone was recovered by extraction with ether. After evaporation of the ether and sublimation at 100 to 150° C. and at a pressure of 1.5–2 mm. Hg, there were obtained 4.78 g. of hydroquinone melting at 171–172° C.

The yield, calculated on reacted acetylene, was 23.5 percent.

In all the examples, the reaction was neutral at the start of the reaction and had, at the end a pH of 3 to 5, due to the formation of small amounts of acetic and propionic acid.

We claim:

1. A process for preparing hydroquinone which comprises reacting acetylene with carbon monoxide and hydrogen, wherein the mole ratio of carbon monoxide to hydrogen is in the range of 0.2 to 10, at temperatures of 100 to 300° C. and at pressures of 50 to 350 atmospheres in an organic solvent which does not contain mobile hydrogen atoms, in contact with trimeric ruthenium tetracarbonyl in amounts of 0.5 to 1 g. per liter of solution.

2. The process as claimed in claim 1 wherein said pressure is obtained by the pressure under which said carbon monoxide and hydrogen are forced into the reaction space.

3. The process as claimed in claim 1 comprising employing as catalyst a ruthenium compound forming said trimeric ruthenium tetracarbonyl under the reaction condition in situ.

4. The process as claimed in claim 1 wherein the mole ratio of solvent to acetylene is in the range of 2 to 15.

5. The process as claimed in claim 1 wherein the mole ratio of carbon monoxide to hydrogen is in the range of 1 to 2.

References Cited
UNITED STATES PATENTS 3,055,949  9/1962  Howk et al. _____ 260—621

LEON ZITVER, *Primary Examiner.*

H. ROBERTS, *Assistant Examiner.*